(12) United States Patent
Anis (10) Patent No.: US 12,283,982 B2
(45) Date of Patent: Apr. 22, 2025

(54) SELF-INTERFERENCE CANCELLATION (71) Applicant: Kabushiki Kaisha Toshiba, Tokyo (JP)

(72) Inventor: Vianney Pascal Philippe Anis, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 371 days.

(21) Appl. No.: 17/847,256

(22) Filed: Jun. 23, 2022

(65) Prior Publication Data

US 2023/0421188 A1    Dec. 28, 2023

(51) Int. Cl.
*H04B 1/10* (2006.01)
*H04L 5/14* (2006.01)

(52) U.S. Cl.
CPC ............ *H04B 1/1036* (2013.01); *H04L 5/14* (2013.01)

(58) Field of Classification Search
CPC ......... H04B 1/1036; H04B 1/525; H04L 5/14; H04L 5/146
See application file for complete search history.

(56) References Cited

U.S. PATENT DOCUMENTS

| | | |
|---|---|---|
| 9,455,761 B2 | 9/2016 | Bharadia et al. |
| 11,018,905 B2 | 5/2021 | Jardak |
| 2016/0142096 A1* | 5/2016 | Bharadia ............... H04B 15/00 375/219 |
| 2021/0126817 A1* | 4/2021 | Jardak ................. H04L 25/0328 |
| 2022/0155408 A1* | 5/2022 | Wiffen .................... G01S 13/95 |

OTHER PUBLICATIONS

U.S. Appl. No. 17/305,272, filed Jul. 2, 2021, Watkins.
U.S. Appl. No. 17/354,647, filed Jun. 22, 2021, Wiffen.
Quiroz et al., "Towards a Full-Duplex CW radar: Development of a reflected power canceller in digital domain", Proceedings of the 6th International Conference on Telecommunications and Remote Sensing, Nov. 2017, pp. 21-26.

* cited by examiner

*Primary Examiner* — Dady Chery
(74) *Attorney, Agent, or Firm* — Oblon, McClelland, Maier & Neustadt, L.L.P.

(57) ABSTRACT

Methods and systems for cancelling self-interference in a full-duplex radio transceiver. The methods include transmitting a transmit signal from a transmit path of the transceiver and receiving a receive signal at a receive path of the transceiver. The receive signal has a self-interference signal component caused by self-interference between the transmit and receive paths. The methods further include generating a filtered signal by filtering an initial signal using an adaptive filter configured based on a target signal derived from the receive signal, wherein the initial signal is derived from the transmit signal; and subtracting a cancellation signal derived from the filtered signal from the receive signal. The target signal is derived from the receive signal by estimating the self-interference signal component in the receive signal, or the cancellation signal is derived from the filtered signal by estimating a part of the filtered signal equal to the self-interference signal component.

17 Claims, 6 Drawing Sheets

SELF-INTERFERENCE CANCELLATION

FIELD OF THE INVENTION

The present invention relates to method and systems for self-interference cancellation in Full Duplex transceivers.

BACKGROUND

Full Duplex (FD) communication is the Simultaneous Transmission And Reception (STAR) of wireless signals on the same frequency at the same time. Full Duplex (FD) technologies have a range of applications. For example, Full Duplex (FD) technologies have been approved as an option for the 802.11ax WiFi standard. Other applications for Full Duplex (FD) technologies are also being explored for example in wireless power transfer, mmWave backhaul and radar.

Self-interference arises in Full Duplex (FD) technologies when a high power transmit signal leaks into the receiver path. Known Full Duplex (FD) system architectures cancel self-interference through a combination of multiple technologies including passive isolation (i.e. separating transmit and receive antennas), digital compensation (i.e. compensating the received signal once converted into a digital signal), and Radio Frequency (RF) cancellation.

Embodiments described herein provide improved methods and systems for cancelling self-interference in full-duplex transceivers.

Arrangements of the embodiments will be understood and appreciated from the following detailed description, made by way of example and taken in conjunction with the drawings.

BRIEF DESCRIPTION OF THE FIGURES

FIG. 6b shows distributions of the errors of the four simulated radar systems of FIG. 6a.

DETAILED DESCRIPTION

According to an embodiment, there is provided a method for cancelling self-interference in a full-duplex radio transceiver, the method comprising: transmitting a transmit signal from a transmit path of the transceiver; receiving a receive signal at a receive path of the transceiver, the receive signal comprising a self-interference signal component caused by to self-interference between the transmit path and the receive path; generating a filtered signal by filtering an initial signal using an adaptive filter, the adaptive filter being configured based on a target signal derived from the receive signal, wherein the initial signal is derived from the transmit signal; and subtracting a cancellation signal from the receive signal; the cancellation signal being derived from the filtered signal; wherein the target signal is derived from the receive signal by estimating the self-interference signal component in the receive signal, or wherein the cancellation signal is derived from the filtered signal by estimating a part of the filtered signal equal to the self-interference signal component.

The self-interference signal component in the receive signal, or the part of the filtered signal equal to the self-interference signal component, may be estimated using properties of the receive signal or the filtered signal, independently of the transmit signal.

Estimating the self-interference signal component in the receive signal, or the part of the filtered signal equal to the self-interference signal component, may comprise determining an average of a plurality of pulses of the receive signal or of the filtered signal.

Estimating the self-interference signal component in the receive signal or the part of the filtered signal equal to the self-interference signal component may comprise identifying a part of the receive signal or the filtered signal with a Doppler frequency shift relative to the transmit signal below a threshold.

Estimating the self-interference signal component in the receive signal or the part of the filtered signal equal to the self-interference signal component may comprise identifying a part of the receive signal or the filtered signal that varies less than a threshold amount between times at which the transmit signal is transmitted with different polarisations.

The filtered signal may be generated from the initial signal by the adaptive filter according to one or more coefficients of the adaptive filter, wherein the one or more coefficients are updated based on a difference between the filtered signal and the target signal.

The adaptive filter may be a Wiener filter.

The full duplex radio-transceiver may be a full duplex weather radar transceiver.

The transmit signal may be transmitted and the receive signal may be received simultaneously on the same frequency band.

The transmit signal may comprise a series of pulses.

The initial signal may be a copy of the transmit signal.

The receive signal may comprise the self-interference signal component and a radar returns component due to reflections of the transmitted transmit signal.

The target signal may comprise at least the self-interference signal component of the receive signal.

The filter may have a transfer function approximating a channel between the initial signal and the target signal.

According to an embodiment, there is provided a system for cancelling self-interference in a full-duplex radio transceiver, the system comprising: a transmit path for transmitting a transmit signal; a receive path for receiving a receive signal, the receive signal comprising a self-interference signal component due to self-interference between the transmit path and the receive path; an adaptive filter for generating a filtered signal from an initial signal, the adaptive filter being configured based on a target signal derived from the receive signal and the initial signal being derived from the transmit signal; a subtractor for subtracting a cancellation signal from the receive signal, the cancellation signal being derived from the filtered signal; a self-interference estimator for deriving the target signal from the receive signal by estimating the self-interference signal component in the receive signal, or for deriving the cancellation signal from the filtered signal by estimating a part of the filtered signal equal to the self-interference signal component.

The self-interference estimator may be configured to estimate the self-interference signal component in the receive signal, or the part of the filtered signal equal to the self-interference signal component, using properties of the receive signal or the filtered signal, independently of the transmit signal.

The self-interference estimator estimating the self-interference signal component in the receive signal or a part of the filtered signal equal to the self-interference signal component may comprise determining an average of a plurality of pulses of the receive signal or of the filtered signal.

The self-interference estimator estimating the self-interference signal component in the receive signal or a part of the filtered signal equal to the self-interference signal component may comprise identifying a part of the receive signal or the filtered signal with a Doppler frequency shift relative to the transmit signal below a threshold.

The self-interference estimator estimating the self-interference signal component in the receive signal or a part of the filtered signal equal to the self-interference signal component may comprise identifying a part of the receive signal or the filtered signal that varies less than a threshold amount between times at which the transmit signal is transmitted with different polarisations.

The adaptive filter may be configured to generate the filtered signal from the initial signal according to one or more coefficients, wherein the one or more coefficients are updated based on a difference between the filtered signal and the target signal.

The adaptive filter may be a Wiener filter.

The full duplex radio-transceiver may be a full duplex weather radar transceiver.

According to an embodiment, there is provided one or more non-transitory storage media comprising computer instructions executable by a processing means of a full-duplex radio transceiver, the computer instructions when executed by the processing means causing the transceiver to: transmit a transmit signal from a transmit path of the transceiver; receive a receive signal at a receive path of the transceiver, the receive signal comprising a self-interference signal component due to self-interference between the transmit path and the receive path; generate a filtered signal by filtering an initial signal using an adaptive filter, the adaptive filter being configured based on a target signal derived from the receive signal, wherein the initial signal is derived from the transmit signal; and subtract a cancellation signal from the receive signal; the cancellation signal being derived from the filtered signal; wherein the target signal is derived from the receive signal by estimating the self-interference signal component in the receive signal, or wherein the cancellation signal is derived from the filtered signal by estimating a part of the filtered signal equal to the self-interference signal component.

The computer instructions, when executed, may perform any optional feature of the method described herein.

According to an embodiment, there is provided a method for cancelling self-interference in a full-duplex radio transceiver, the method comprising: transmitting a transmit signal comprising one or more pulses from a transmit path of the transceiver; receiving a receive signal at a receive path of the transceiver, the receive signal comprising a self-interference signal component caused by to self-interference between the transmit path and the receive path; generating a filtered signal by filtering an initial signal using an adaptive filter according to one or more coefficients of the adaptive filter, the initial signal being derived from the transmit signal; and subtracting the filtered signal from the receive signal; wherein the one or more coefficients are updated based on a difference between the filtered signal and the receive signal during only initial periods of the one or more pulses. The method may comprise any suitable features described herein.

According to an embodiment, there is provided a system configured to perform a method as described above.

According to an embodiment, there is provided one or more non-transitory storage media comprising computer instructions executable by a processing means of a full-duplex radio transceiver, the computer instructions when executed by the processing means causing the transceiver to perform a method as described above.

Referring to the figures generally, there are shown examples of full-duplex radio transceivers, and embodiments of such transceivers configured to cancel self-interference in their received signals using an adaptive filter and an additional self-interference estimator.

Figure 1A:
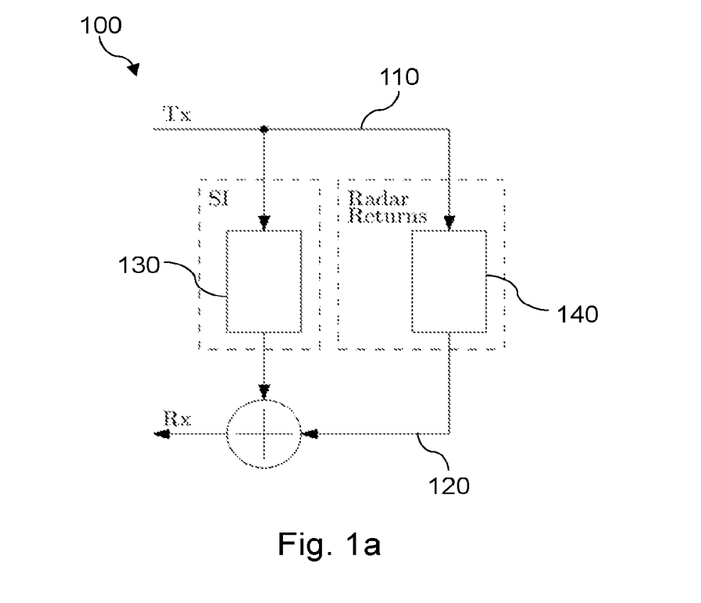
FIG. 1a shows a simple channel model fora full duplex radar system.
Figure 1B:
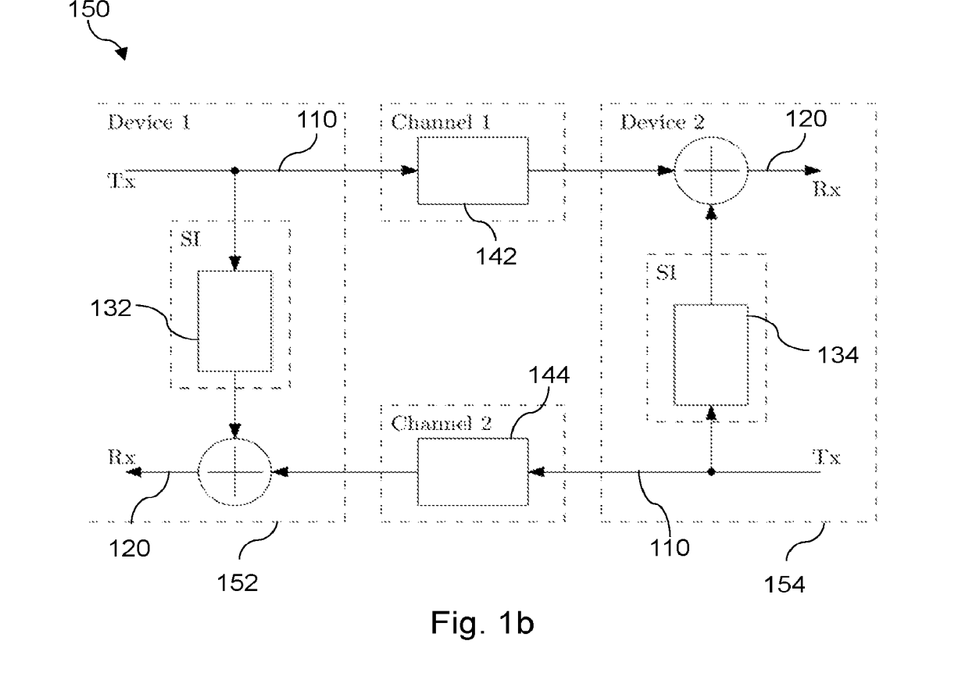
FIG. 1b shows a simple channel model for a full duplex communication system.

FIGS. 1a and 1b show a simple channel models for a full-duplex radar system 100 and a full duplex communication system 150 respectively, modelling the channels between transmit and receive paths thereof. The full-duplex radar system 100 consists of a single full duplex radio transceiver arranged to simultaneously transmit radio signals consisting of a series of pulses or chirps and to receive reflections of said signals from targets. The full-duplex communication system consists of two full-duplex radio transceivers 152, 154 arranged to simultaneously transmit signals to, and receive signals from, each other.

Full-duplex radios, such as the transceivers modelled in FIGS. 1a & 1b, are configured to transmit and receive simultaneously at the same frequency, either using a single antenna or multiple antennae. For example, a radio may comprise a transmit path 110, a receiver path 120, and a single antenna, coupled to each other by a circulator configured to allow a signal to pass from the transmit path 110 to the antenna and the antenna to the receive path 120, but not from the transmit path 110 to the receive path 120. Alternatively, a radio could comprise separate transmit and receive paths 110, 120 with their own antennae.

In such full-duplex radios, signals may leak from the transmit path 110 to the receive path 120, for example as a result of imperfect isolation in a circulator as described above, as a result of electromagnetic coupling between the transmit and receive paths 110, 120, or due to reflection produced by antenna mismatch, resulting in self-interference (SI) between the transmit and receive paths 110, 120. In FIGS. 1a and 1b such self-interference is modelled in the form of self-interference channels 130, 132, 134 between the transmit paths 110 and receive paths 120 of each transceiver 152, 154.

In the simple channel model of a full-duplex radar 100 shown in FIG. 1a, the overall channel between the transmit and receive paths comprises a first self-interference component 130, modelling self-interference leakage between the transmit and receive paths and a radar returns component 140 modelling the actual radar channel between the transmit and receive paths, including received reflections of a transmitted radio signal from one or more targets. In the full-duplex radar the correlation between the received and transmitted signals is very high.

Where the transmitted signal in a full-duplex radar system as shown in FIG. 1a is x[n], a function of discrete time n, and h[n] is the overall channel between the transmit path 110 and the receive path 120, the received signal y[n] may be given by:

$$y[n]=(x*h)[n]$$

The overall channel h can be modelled as the self-interference part $h_{SI}$; 130 and the radar returns part $h_{RR}$ 140, generating a respective self-interference signal $y_{SI}[h]$, and radar returns signal $y_{RR}[n]$ which are summed together producing the total received signal y[n].

$$y[n]=y_{SI}[n]+y_{RR}[n]$$

$$y[n]=(x*h_{SI})[n]+(x*h_{RR})[n]$$

The simple channel model of the full-duplex communication system shown in FIG. 1b, shows separate self-interference channels 132, 134 between the transmit and receive paths 110, 120 of the two transceivers 152, 154 representing the respective self-interference of each transceiver, as well as two separate channels 142, 144 between each transmit path 110 and the other transceiver's receive path 120. In the communication system a signal received by the first transceiver 152 is likely to be different to, and not correlated with, a signal that that the second transceiver 154 is transmitting.

Where $x_1[n]$ is the signal transmitted by the first full-duplex transceiver 152 shown in FIG. 1b via a channel $h_{C,1}[n]$ 142 from the first transceiver 152 to the second transceiver 154, $x_2[n]$ is the signal transmitted by the second transceiver 154 via the channel $h_{C,2}[n]$ 144 from the second transceiver 154 to the first transceiver 152, and $h_{SI,1}[n]$ and $h_{SI,2}[n]$ are the self-interference channels 132, 134 within the first and second transceivers 152, 154 respectively, the overall signal $y_1[n]$ received by that transceiver may be given by:

$$y_1[n]=(x_1*h_{SI,1})+(x_2*h_{C,2})[n]$$

A signal of interest received by a full-duplex radio transceiver may have a power orders of magnitude lower than a signal being transmitted, and the power of the self-interference may therefore be significant compared to, or higher than, the amplitude of the signal of interest. Therefore, in order to accurately receive the signal of interest it is necessary to cancel the self-interference from the transmit path 110. This is referred to as self-interference cancellation (SIC). Additionally, systems may provide increased passive isolation between transmit and receive paths of a transceiver to minimise self-interference.

Full-duplex systems may use analogue self-interference radio-frequency self-interference cancellation (RFSIC) and/or digital self-interference cancellation (DSIC). For example, analogue self-interference cancellation may comprise producing an approximate replica of the self-interference signal in the analogue domain by applying delays, phase-shifts, and attenuations to one or more tapped portions of an analogue signal from the transmit path 110, and coupling it to a signal in the receive path 120 before an analogue-to-digital converter. Digital self-interference cancellation may comprise compensating a received signal after it is converted into a digital signal using an adaptive filter.

Figure 2:
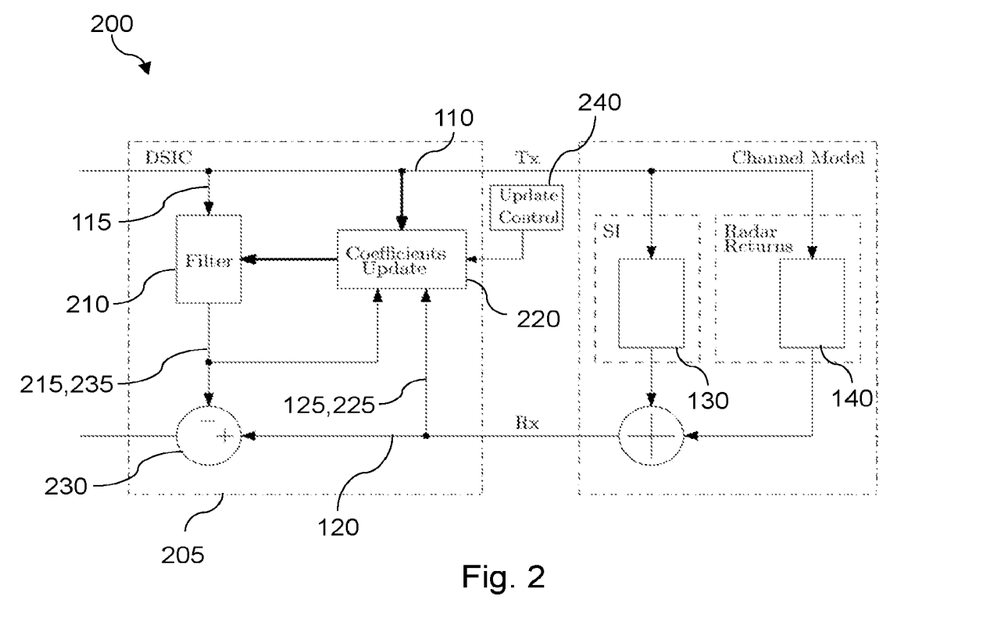
FIG. 2 shows an example of a full-duplex radar system comprising digital self-interference cancellation functionality.

FIG. 2 shows an example of a full-duplex radar system 200 comprising digital self-interference cancellation functionality 205. While the digital self-interference cancellation functionality is shown for a transceiver operating as a radar system 100, as shown in FIG. 1a, such functionality may also be applied to transceivers 152, 154 in communication systems 150, such as a system as shown in FIG. 1b.

The system comprises an adaptive filter 210 configured to filter a signal 115 from the transmit path 110 (for example, a copy of a transmit signal thereof) in order to generate a filtered signal 215 that is an estimate of the self-interference in the received signal in the receive path 120. The filtered signal 215 defines a cancellation signal 235, that is subtracted from the received signal in the receive path 120 using a combiner 230 in order to remove such self-interference and obtain a signal of interest.

Figure 5:
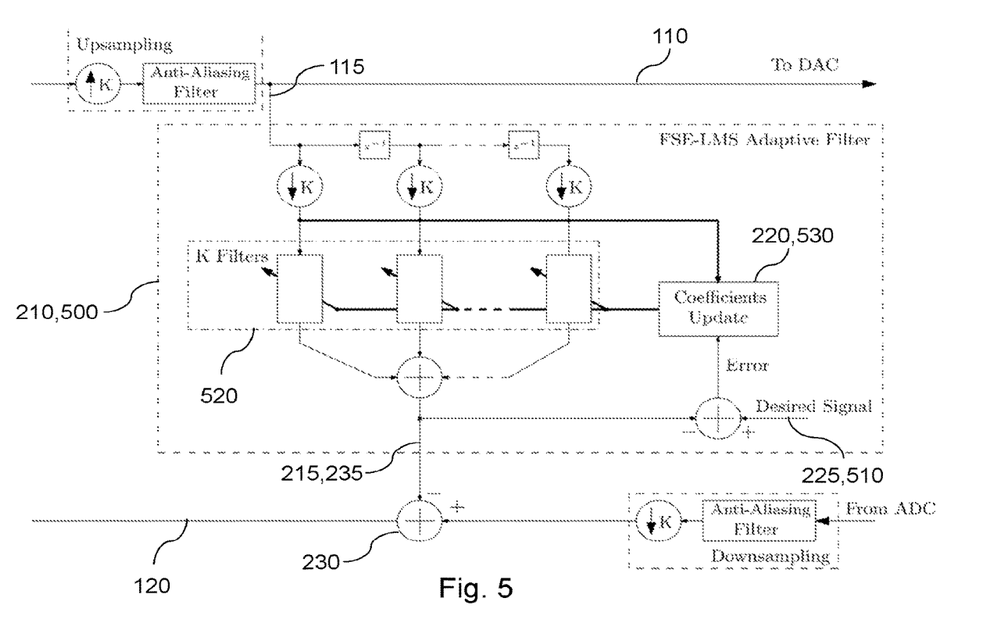
FIG. 5 shows an adaptive filter configured to filter a transmit signal to estimate a target signal.

The adaptive filter 210 filters an initial signal 115 from the transmit path 110 according to one or more coefficients (which define a transfer function of the filter) which are updated in use during adjustment of the adaptive filter 210. FIG. 2 shows the coefficients being updated by a coefficients updater 220. It will be appreciated that such an updater may be comprised by the filter itself 210 (for example, as shown in FIG. 5), or may be external. The coefficients updater 220 receives a filtered signal 215 generated by the filter 210 and a target signal 225 (sometimes referred to as a desired signal), which in the digital self-interference canceller 205 shown in FIG. 2 is a copy of the receive signal 125 from the receive path 120.

The coefficients are updated based on differences, or "errors" between the filtered estimate signal 215 output by the filter 210 and the target signal 225 provided to the filter. These errors may be or may define a cost function. The coefficients are updated to minimize the errors according to some optimization algorithm such as a gradient descent algorithm, such that the transfer function of the filter 210 is adjusted to approximate the channel between the source transmit signal 115 and the target receive signal 225. In some embodiments, the coefficients updater 220 may receive a copy of the transmit signal, as shown in FIG. 2, which may enable an optimization algorithm such as a gradient descent algorithm to be performed on the cost function of the filter.

The adaptive filter 210 may be a Wiener filter or other filter configured to estimate a portion of the received signal that is correlated with the transmitted signal. In a transceiver 152, 154 of a communication system 100, as shown in FIG. 1b, where a received signal of interest is not highly correlated with the transmitted signal, a correlated portion of the received signal may be generally assumed to approximately equal to the self-interference therein, allowing the self-interference 130 to be estimated and filtered out.

In use, such an adaptive Wiener filter 210 may receive a transmitted signal 115 as an input and may output an estimate of a received signal $y_{DSIC}$ 215 which may be subtracted from a received signal y[n] 125 used as a target signal 225 to obtain an estimation error e[n]. Where $w_n$ is a coefficient vector for the adaptive filter at time n and a tap delay line $x_n$ and $(\cdot)^H$ is the Hermitian transpose operator, the estimated signal $y_{DSIC}$ and estimation error e[n] may be given by:

$$y_{DSIC}[n]=w_n^H x_n$$

$$e[n]=y[n]-y_{DSIC}[n]$$

An accurate estimation of the received signal, and consequently of the total channel between the transmit path 110 and receive path 120 may be obtained by minimising the estimation error. The optimum coefficient vector that minimises the error, $w_{opt}$, may be obtained via the Wiener-Hopf solution as a function of $R^{-1}=(E\{x_n \cdot x_n^H\})^{-1}$, the inverse covariance matrix of the transmitted signal, and $p=\text{Corr}(y[n], x_n)$, the correlation vector between the transmitted and received signals.

$$w_{opt}=R^{-1} \cdot p$$

In a transceiver 152, 154 of a full-duplex communication system 150, as shown in FIG. 1b, comprising such a filter 210, the correlation vector p can be expressed as:

$$p=\text{Corr}(((x_{n,1} \cdot h_{SI,1})+(x_{n,2} \cdot h_{C,2})), x_{n,1})$$

$$p=\text{Corr}((x_{n,1} \cdot h_{SI,1})+\text{Corr}((x_{n,2} \cdot h_{C,2}), x_{n,1})$$

However, as the signal $x_{n,1}$ transmitted from a first receiver 152 is likely to have very low correlation with the signal $x_{n,2}$ received by first transceiver 152 from a second transceiver 154, the second term may be assumed to be much smaller than the first, therefore the correlation vector approximates to:

$$p=\text{Corr}((x_{n,1} \cdot h_{SI,1}), x_{n,1})$$

Therefore, in such communication systems, the optimum filtering coefficient obtained during adjustment of the filter is approximately equal to the self-interference channel 132 between the transmit path 110 and the receive path 120. Therefore the low correlation between the transmitted and received signals, a selected filter length and an algorithm convergence speed may allow for an accurate estimate of the self-interference channel 132.

In use, an accurate estimate of the self-interference channel 130 obtained by adjusting the filter 210 may be used to filter the transmit signal into a filtered cancellation signal 215, 235 matching the self-interference of the transceiver, which may be subtracted from received signals in order to obtain the signal of interest without the self-interference.

However, in a transceiver of a full-duplex radar system 100, as shown in FIG. 1a or FIG. 2, both radar returns and self-interference are highly correlated with the transmitted signal In such a full-duplex radar system 100 comprising a filter 210, as shown in FIG. 2, the correlation vector p can instead be expressed as:

$$p=\text{Corr}(((x_n \cdot h_{SI})+(x_n \cdot h_{RR})), x_n)$$

$$p=\text{Corr}((x_n \cdot h_{SI}), x_n)+\text{Corr}((x_n \cdot h_{RR}), x_n)$$

Both the self-interference 130 and radar returns 140 parts of the channel correlate strongly with the transmitted signal, therefore the Weiner-Hopf solution only provides an estimate of the total channel $h=h_{SI}+h_{RR}$. As the radar returns portion of the received signal is correlated with the transmitted signal, the second term is not negligible unless the radar returns are negligible and it is therefore not possible to derive the self-interference of the radar system from the Weiner-Hopf solution unless the radar returns are not significant.

Embodiments described herein provide systems and methods for filtering self-interference in full-duplex radar transceivers.

FIG. 2 shows an example of filtering self-interference using an adaptive filter 210 as described above, configured only to update its coefficients during an initial period of each pulse of the transmit signal, for example, during an initial number of samples. The initial period of each pulse may be before any radar returns due to reflections from targets of that pulse are anticipated so that radar returns may be expected to be small or negligible and the entire receive signal may be assumed to be due to self-interference. Therefore by only updating the parameters of the adaptive filter in this period, the filter may be assumed to be configured to replicate the self-interference channel 130 only.

The system may use a fast converging algorithm with a low number of coefficients to do so. The initial period may correspond to a minimum distance (such as a few hundred meters), which may be a minimum distance to an expected target, such that the radar returns may be assumed to be negligible and the estimated channel may be assumed to include only self-interference.

The system may comprise an external coefficient update controller 240, as shown in FIG. 2, which may control the filter such that it only updates its coefficients during the initial period of each pulse.

However a method of estimating and cancelling self-interference in a full-duplex radar system as described above, in which the self-interference channel 130 is estimated based on initial samples of the received signal can be inaccurate where targets are located very close to the radar transceiver, within a minimum distance corresponding to the initial period described above. Such targets would provide radar returns during the initial period, preventing the samples of the received signal used as a target by the adaptive filter from only representing self-interference. This can therefore reduce the reliability of radar system's self-interference cancellation and by extension, reduce the certainty of the output provided by the radar system.

Figure 3A:
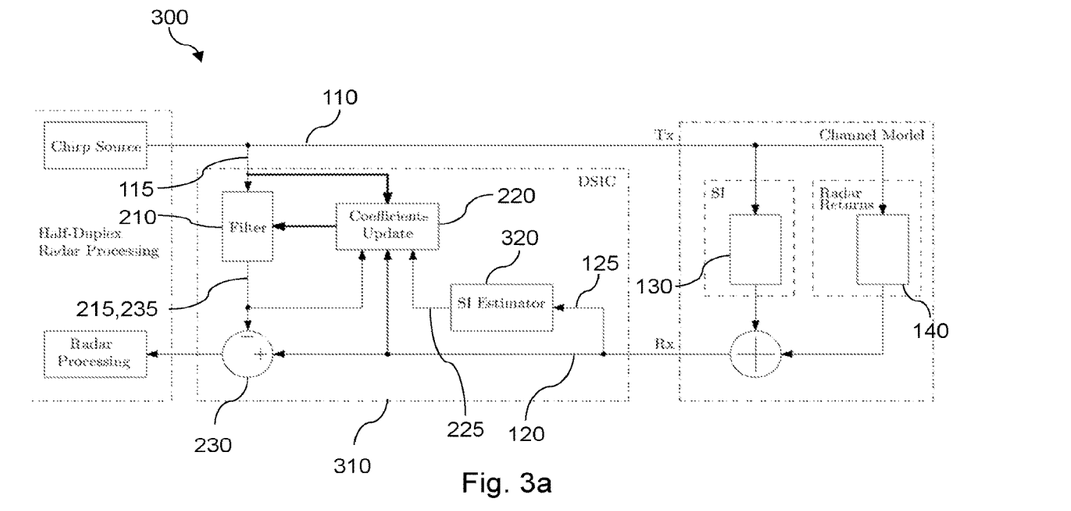
FIG. 3a shows an embodiment of a full duplex radar transceiver comprising a self-interference estimator configured to identify a self-interference part of a received signal and an adaptive filter configured to estimate the self-Interference part of the received signal.
Figure 3B:
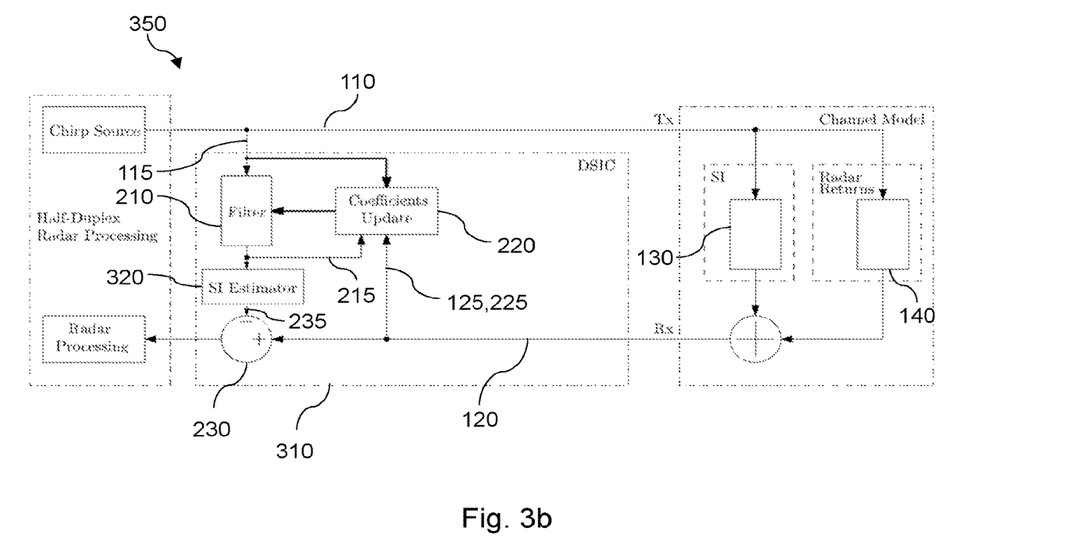
FIG. 3b shows an embodiment of a full duplex radar transceiver comprising an adaptive filter configured to estimate a received signal and a self-interference estimator configured to identify a self-interference part of the estimate of the received signal.

Embodiments described below with reference to FIGS. 3a to 3b provide improved systems and methods for filtering self-interference in full duplex transceivers.

In such embodiments, an adaptive filter 210 generates a filtered signal 215 from an initial signal derived from a transmit signal (such as a copy of the transmit signal 115), the adaptive filter 210 (and/or coefficients thereof) being based on a target signal 225 that is derived from the receive signal 125. A cancellation signal 235 derived from the filtered signal 215 is then subtracted from a receive signal in the receive path 120.

Embodiments differ from the system described above with reference to FIG. 2 in that the cancellation signal 235 is derived from the filtered signal 215 and/or the target signal 225 is derived from the receive signal 125 by estimating a self-interference component thereof. This may be performed using a self-interference estimator 320.

FIGS. 3a and 3b show embodiments of such full duplex radar transceivers 300, 350 with digital self-interference cancellers 310 each comprising an adaptive filter 210 and a self-interference estimator 320.

The self-interference estimators 320 are each configured to estimate a self-interference portion of an input signal, which may be a copy of the receive signal 115 (as in the transceiver 300 of FIG. 3a) or a filtered signal 215 output by the filter (as in the transceiver 350 of FIG. 3b).

The self-interference portion of the a receive signal 125 may be the signal component generated by the self-interference 130 between the transmit path 110 and the receive path 120, and the self-interference portion of such a filtered signal 215 may be a portion of the filtered signal 125 equal to such a self-interference signal component, due to the filter 210 replicating the channel between the transmit path 110 and the receive path 120, including the self-interference part 130 thereof.

The self-interference estimator 320 may use differences in the characteristics of self-interference and radar returns signal components within its input signal, such as slow variation or the absence or presence of Doppler related frequency shift, to differentiate self-interference and radar returns within the signal.

The self-interference estimator 320 preferably identifies the self-interference within its input signal based on the signal itself, without use of or comparison to the transmit signal (this may be referred to as a blind estimation of the self-interference in the signal). In contrast the output 215 of the adaptive filter 210 depends upon the transmit signal 115 which forms the input of the adaptive filter 210, and upon the target signal 225 using which coefficients of the filter are determined.

In some embodiments, the self-interference estimator 320 is configured to receive an input signal, to estimate a self-interference part thereof, and to provide the estimated self-interference part thereof as a target signal 225 to the adaptive filter 210.

In some such embodiments, such as the transceiver 300 shown in FIG. 3a, the input signal may be a copy of the received signal 125 from the receive path 120, or another signal derived therefrom, such that output of the self-interference estimator 320 provided as the target signal 225 to the adaptive filter 210 may be the self-interference estimator's estimate of the self-interference comprised by the received signal. In such embodiments, the adaptive filter 210 may estimate only the self-interference channel 130 between the transmit path 110 and the receive path 120.

When coefficients of the adaptive filter are adjusted, the filtered signal 215 generated by the adaptive filter 210 may be an estimate of the self-interference signal component of the received signal 125 only (rather than of the entire received signal 125 as described above with reference to FIG. 2) and the estimation error may be equal to the difference between its estimation, and the target signal self-interference estimate 225 output by the self-interference estimator (rather than between its estimate of the entire received signal and the actual entire received signal 125, as described above with reference to FIG. 2).

In some such embodiments, as shown in FIG. 3a, the adaptive filter 210 and/or coefficients updater 220 thereof may also receive a copy of the receive signal from the receive path 120 in addition to the output of the self-interference estimator 320. Such an adaptive filter 210 and/or coefficients updater 220 thereof may be configured to use the copy of the receive signal, or a combination of the copy of the receive signal and the output of the self-interference estimator 320 (such as an average, or weighted average thereof) as a target signal. For example the adaptive filter 210 may be configured to switch between different target signals, which may include the output of the self-interference estimator, the copy of the receive signal, and/or one or more combinations thereof. In other embodiments, the adaptive filter 210 and/or coefficients updater 220 thereof may not receive a copy of the receive signal.

In alternative embodiments, the self-interference estimator 320 may receive a combination of the transmit signal 115 and the receive signal 125 (such a weighted average thereof), and may estimate a self-interference part thereof, and may provide the estimated self-interference part thereof as a target signal 225 to the adaptive filter 210. This may reduce a level of noise within the estimate of the self-interference estimator that is provided to the filter 210 as a target signal 225.

In other embodiments, such as the transceiver 350 shown in FIG. 3b, the self-interference estimator 320 is configured to receive a filtered signal 215 output by the adaptive filter 210, and to estimate a self-interference part thereof, and may thereby generate a cancellation signal 235. This cancellation signal 235 may then be subtracted from a received signal in the receive path 120 of the transceiver 350 to obtain a signal of interest. The filtered signal 215 output by the adaptive filter 210 may be an estimate of entire received signal output by an adaptive filter 210, which may be configured using a copy of the receive signal 125 as a target signal 225. In such embodiments, the adaptive filter 210 may be configured to estimate the entire channel between the transmit path 110 and the receive path 120 and to output a filtered signal 215 estimating the entire received signal 125, as in the system shown in FIG. 2.

The estimation of the self-interference portion of an input signal (such as a received signal 125 as in FIG. 3a, or a filtered signal 215 as in FIG. 3b) by the self-interference estimator 320 may comprise taking an average or weighted average of multiple samples of that signal, such as samples of that signal during or transmission of a plurality of different pulses or chirps by the transceiver. As the self-interference part of the received signal is likely to vary slowly in comparison to the radar returns part, the relatively consistent self-interference parts of the multiple samples may be approximately equal and therefore preserved by this averaging process, whereas the more varied radar returns will become less significant as they are averaged. The average may be weighted to provide increased weighting to more recent pulses, this may decrease the influence of older pulses on the estimate of self-interference, preventing slow changes in the self-interference of the transceiver from significantly reducing the accuracy of the estimate.

Figure 4:
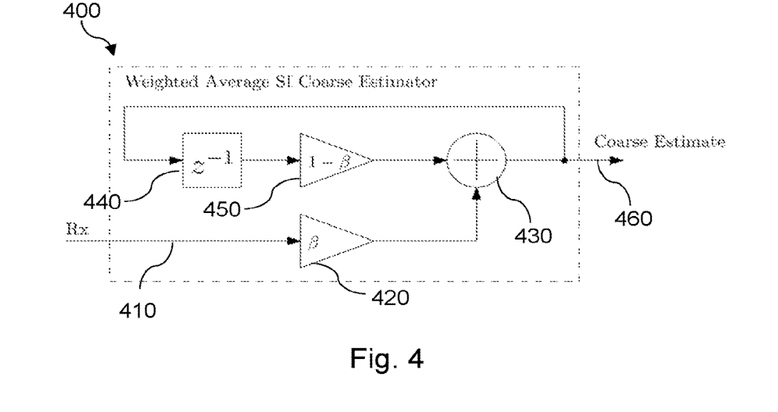
FIG. 4 shows a self-interference estimator configured to determine a self-interference part of a signal

FIG. 4 shows an example of a self-interference estimator 400 for use in a full-duplex radar transceiver 300, 350 as described above, which outputs a weighted average 460 of samples of a signal 410 in which the self-interference part is to be estimated (such as the received signal of a transmit path in a transceiver as shown in FIG. 3a). The estimator 400 comprises a first gain component 420, an adder 430, a delayer 440, and a second gain component 450.

In a self-interference estimator such as the estimator 400 shown in FIG. 4, the power or amplitude of a received signal 410 is multiplied by a factor $\beta$ (for example, by the first component 420). The amplified signal is then added (for example, by the adder 430) to a previously calculated weighted average of samples of the signal that has been delayed (for example, by the delay means 440) and multiplied by 1-$\beta$ (for example, using the second amplifier 450), thereby calculating a new weighted average 460. The new weighted average 460 is both output by the self-interference estimator 400 and delayed and amplified to be added to a new amplified received sample.

Alternatively, or additionally, the estimation of the self-interference portion of an input signal by the self-interference estimator 320 may comprise determining and/or extracting parts of the signal that have no, or relatively low, Doppler induced-frequency shift, for example Doppler induced frequency shift below a threshold value. This enables parts of a signal corresponding to self-interference to be identified as they will have no, or relatively low, Doppler induced frequency shift, whereas radar returns due to reflections from moving targets will be Doppler shifted. In some embodiments the self-interference portion may be obtained by transforming the signal into the delay-Doppler domain, excluding parts of the signal with shift coefficients greater than some threshold, and then inversing the transformation.

In some embodiments, the radar system may be a dual-polarization radar system, which may be configured to transmit signals with a plurality of different polarisations. In such embodiments, the estimation of the self-interference portion of an input signal by the self-interference estimator 320 may additionally or alternatively comprise identifying parts of the signal that do not vary, or vary less than some threshold amount, between different polarisations. This may enable parts of the signal corresponding to self-interference to be identified as they are more likely to be similar to each other between polarisations than radar returns.

FIG. 5 shows an example of an adaptive filter 500 for use in systems as described above. The adaptive filter 500 is configured to estimate a channel between a digital portion of the transmit path 110 and a desired target signal 510 by updating coefficients 530 of a series of parallel filter means 520 to minimise an error between an estimate of the desired signal obtained by combining the outputs of the filter means 520 and the target signal itself 510, using an optimization algorithm such as a least mean square algorithm. In the illustrated filter, the target signal is an estimated self-interference part of the received signal, such as an estimate as output by the self-interference estimator shown in FIG. 4, such that adjusting the filter's coefficients to minimise the error configures the filter 500 to have a transfer function corresponding to only the self-interference channel between the transmit and receive paths.

The adaptive filter 500 may be a fractionally spaced equalizer adaptive filter, which may provide a faster convergence rate than other standard adaptive filter structures. Additionally, using a fractionally spaced equalizer as an adaptive filter may improve estimations of unlinearities, due to a higher sampling rate at its input and the combination of multiple linear filter's outputs to create an estimate.

In embodiments using a self-interference estimator as described above, an adaptive filter 210, 500 and/or coefficients thereof may be continually updated during operation of the filter.

In some embodiments, the full-duplex radar system may be a weather radar system. The relatively high power of weather radar typically may prevent reception during transmission due to self-interference directly feeding into the receive path, and targets close to a receiver may prevent self-interference cancellation techniques as described above with reference to FIG. 2 from reliably cancelling self-interference. Self-interference cancellation techniques as described with reference to FIG. 3*a* onwards may therefore be employed.

Existing weather radar systems may be configured to transmit low power short-time pulses for short range operation, and high-power long-time pulses for more distant targets, in order to reduce self-interference with targets close to the transceiver. However self-interference cancellation embodiments as described herein may allow only high-power pulses to be used for all ranges.

Embodiments described provide improved cancellation of self-interference by use of a secondary estimation of self-interference by the self-interference estimator in combination with the adaptive filter, which may take advantage of both characteristics of the self-interference and repetition of transmitted pulses, and which are less likely than previous techniques to be affected by changes in radar returns from targets close to the transceiver, or fast changes in the channel between the transmit path and the receive path. The self-interference estimator may be a low cost addition to a transceiver while significantly improving self-interference cancellation.

Figure 6A:
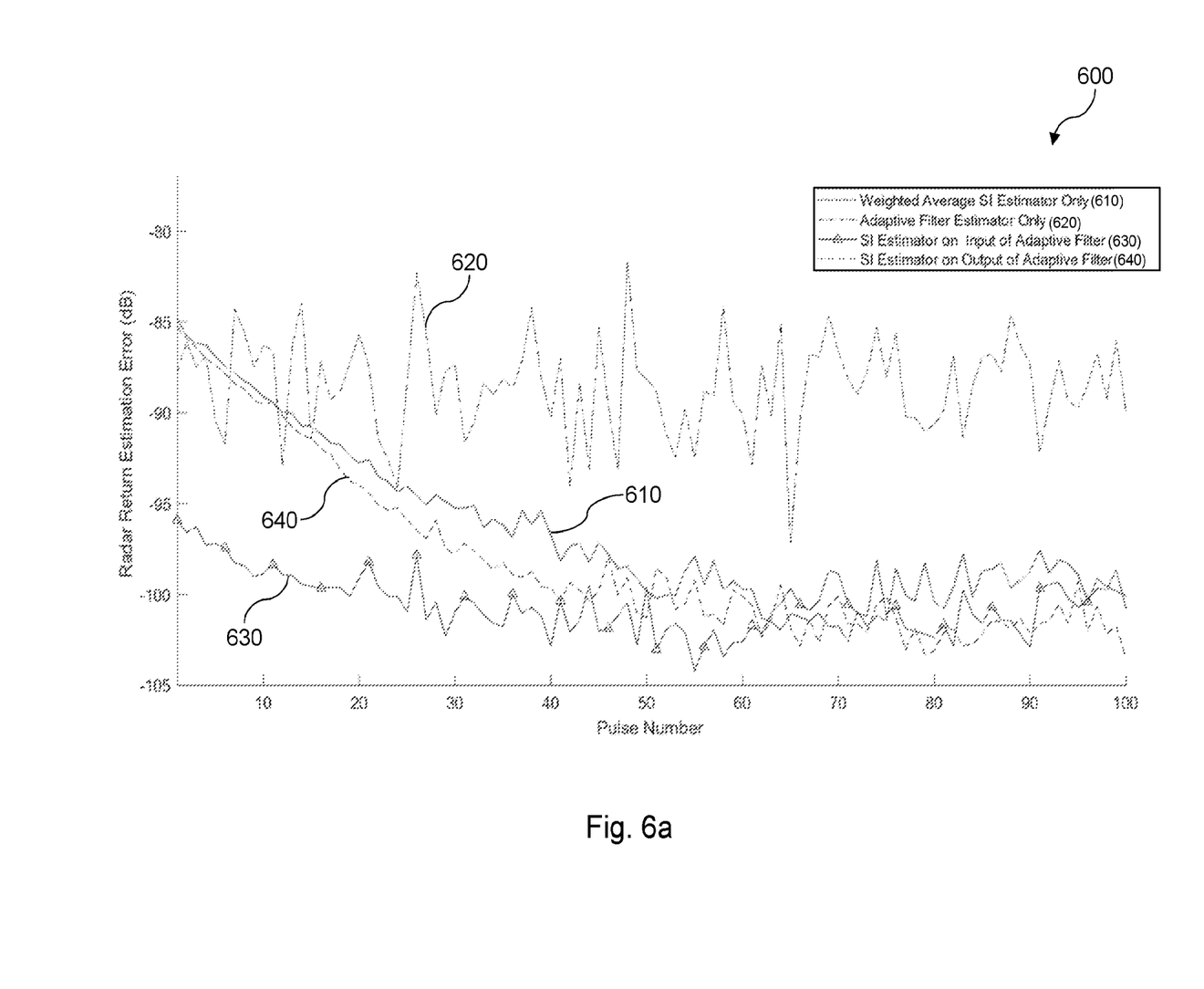
FIG. 6a shows error with which four simulated full-duplex radar systems estimated radar returns over a series of radar pulses.
Figure 6B:
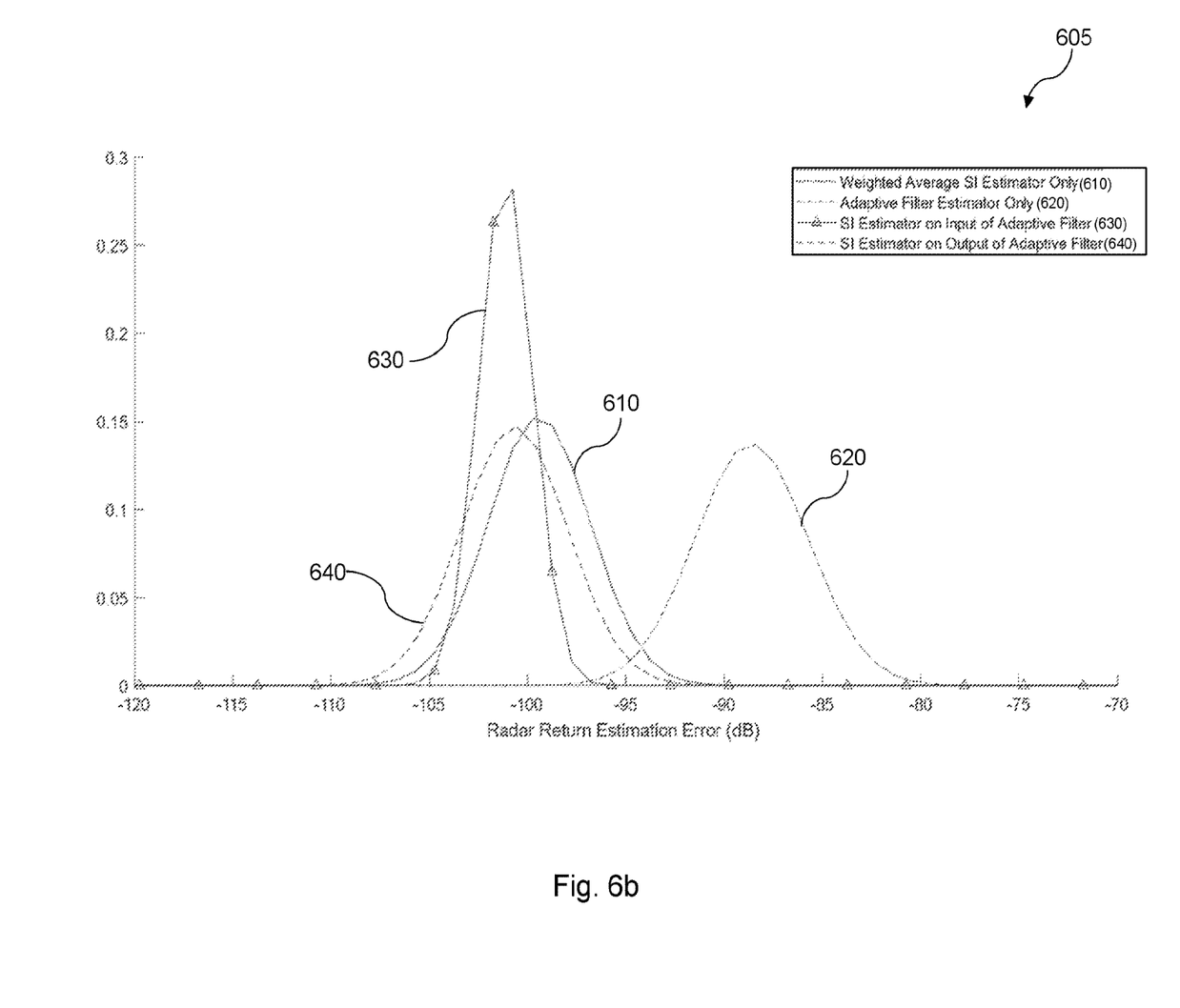

FIGS. 6*a* and 6*b* show simulation results demonstrating the effectiveness of full-duplex radar systems as shown in FIGS. 3*a* and 3*b* above, configured to cancel self-interference using an adaptive filter and a secondary self-interference estimator configured to average received signals over a plurality of pulses.

FIG. 6*a* is a graph 600 the mean square error in decibels with which four different simulated full-duplex weather radar systems estimated radar returns over a series of one hundred transmitted radar pulses, by subtracting estimates of self-interference from the received pulses. The simulated radar returns portion of the channel between transmit paths 110 and receive paths 120 of the simulated transceivers was changed regularly between simulation runs, but with a significant number of the simulated returns being received concurrently with the transmission of pulses, such that they experienced self-interference, with the self-interference remaining relatively constant between simulation runs. The simulated radar returns included returns early in the durations of the simulated pulses, simulating the effects of targets close to the transmitter.

The graph shows the errors 610 of a first system comprising no adaptive filter and only a weighted average self-interference estimator 400 as shown in FIG. 4; errors 620 of a second system 200 as shown in FIG. 2, comprising only an adaptive filter 210, 500 as shown in FIG. 5 whose coefficients are only updated in the first few samples of a received pulse; errors 630 of a third system 300 as shown in FIG. 3*a* comprising a self-interference estimator 320, 400 as shown in FIG. 4 configured to identify a self-interference part of a received signal and an adaptive filter 210, 500 as shown in FIG. 5 configured to estimate the self-interference part of the received signal; and errors 640 of a fourth system 350, as shown in FIG. 3*b*, comprising an adaptive filter 210, 500 as shown in FIG. 5 configured to estimate a received signal and a self-interference estimator 320, 400 as shown in FIG. 4 configured to identify a self-interference part of a the estimate of the received signal.

FIG. 6*b* shows a distribution 605 of the number of times each of the four systems estimated received pulses with given errors over the series of one hundred pulses shown in FIG. 6. The second system 200, as shown in FIG. 2, had significantly higher errors 620 than the three systems comprising weighted average self-interference estimators, with errors around −88 dB. The first system comprising only the weighted average self-interference estimator 400 had errors around −100 dB, and the third and fourth systems shown in FIGS. 3*a* and 3*b*, comprising both average self-interference estimators 320, 400 and adaptive filters 210, 500, had the lowest errors around −101 dB.

The third system, as shown in FIG. 3*a* cancelled its self-interference the most reliably, having a faster convergence rate, a lower average error, and a narrower distribution of errors 630 reflecting improved predictability of the achievable self-interference cancellation.

While certain arrangements have been described, they have been presented by way, of example only, and are not intended to limit the scope of protection. The inventive concepts described herein may be implemented in a variety of other arrangements. In addition, various additions, omissions, substitutions and changes may be made to the arrangements described herein without departing from the scope of the invention as defined by the following claims.

The invention claimed is:

1. A method comprising:
   transmitting a transmit signal from a transmit path of a full-duplex radio transceiver;
   receiving a receive signal at a receive path of the transceiver, the receive signal including a self-interference signal component caused by self-interference between the transmit path and the receive path, the self-interference to be cancelled;

generating a filtered signal by filtering an initial signal from the transmit path according to one or more coefficients which define a transfer function of an adaptive filter, the adaptive filter being configured based on a target signal derived from the receive signal, the filtered signal being an estimate of the self-interference in the received signal in the receive path, wherein the initial signal is a copy of the transmit signal; and subtracting a cancellation signal from the receive signal, the cancellation signal being defined by the filtered signal and the cancellation signal being subtracted from the received signal in the receive path using a combiner in order to remove the self-interference and obtain a signal of interest;

wherein the target signal is derived from the receive signal by estimating the self-interference signal component in the receive signal based on the receive signal and the cancellation signal is the filtered signal, or wherein the target signal is a part of the receive signal and the cancellation signal is derived from the filtered signal by estimating a part of the filtered signal based on the filtered signal, the part of the filtered signal being equal to the self-interference signal component.

2. The method according to claim 1, wherein the self-interference signal component in the receive signal, or the part of the filtered signal equal to the self-interference signal component, is estimated using properties of the receive signal or the filtered signal, independently of the transmit signal.

3. The method according to claim 2, wherein the estimating the self-interference signal component in the receive signal or the part of the filtered signal equal to the self-interference signal component includes identifying a part of the receive signal or the filtered signal that varies less than a threshold amount between times at which the transmit signal is transmitted with different polarisations.

4. The method according to claim 2, wherein the filtered signal is generated from the initial signal by the adaptive filter according to one or more coefficients of the adaptive filter, wherein the one or more coefficients are updated based on a difference between the filtered signal and the target signal.

5. The method according to claim 2 wherein the adaptive filter is a Wiener filter.

6. The method according to claim 2 wherein the full duplex radio-transceiver is a full duplex weather radar transceiver.

7. The method according to claim 1, wherein estimating the self-interference signal component in the receive signal, or the part of the filtered signal equal to the self-interference signal component, includes determining an average of a plurality of pulses of the receive signal or of the filtered signal.

8. The method according to claim 1, wherein estimating the self-interference signal component in the receive signal or the part of the filtered signal equal to the self-interference signal component includes identifying a part of the receive signal or the filtered signal with a Doppler frequency shift relative to the transmit signal below a threshold.

9. A system comprising:

a transmit path for transmitting a transmit signal, the transmit path being included in a full duplex radio transceiver;

a receive path for receiving a receive signal, the receive path being included in the transceiver, the receive signal including a self-interference signal component due to self-interference between the transmit path and the receive path, the self-interference to be cancelled;

an adaptive filter for generating a filtered signal from an initial signal from the transmit path according to one or more coefficients which define a transfer function of the adaptive filter, the adaptive filter being configured based on a target signal derived from the receive signal, the filtered signal being an estimate of the self-interference in the received signal in the receive path, the initial signal being a copy of the transmit signal;

a subtractor for subtracting a cancellation signal from the receive signal, the cancellation signal being defined by the filtered signal and the cancellation signal being subtracted from the received signal in the receive path using a combiner in order to remove the self-interference and obtain a signal of interest; and a self-interference estimator for deriving the target signal from the receive signal by estimating the self-interference signal component in the receive signal based on the receive signal, and the cancellation signal being the filtered signal, or for deriving the cancellation signal from the filtered signal by estimating a part of the filtered signal based on the filtered signal, the part of the filtered signal being equal to the self-interference signal component, the target signal being a part of the receive signal.

10. The system according to claim 9, wherein the self-interference estimator is configured to estimate the self-interference signal component in the receive signal, or the part of the filtered signal equal to the self-interference signal component, using properties of the receive signal or the filtered signal, independently of the transmit signal.

11. The system according to claim 9, wherein the self-interference estimator estimating the self-interference signal component in the receive signal or a part of the filtered signal equal to the self-interference signal component includes determining an average of a plurality of pulses of the receive signal or of the filtered signal.

12. The system according to claim 9, wherein the self-interference estimator estimating the self-interference signal component in the receive signal or a part of the filtered signal equal to the self-interference signal component includes identifying a part of the receive signal or the filtered signal with a Doppler frequency shift relative to the transmit signal below a threshold.

13. The system according to claim 9, wherein the self-interference estimator estimating the self-interference signal component in the receive signal or a part of the filtered signal equal to the self-interference signal component includes identifying a part of the receive signal or the filtered signal that varies less than a threshold amount between times at which the transmit signal is transmitted with different polarisations.

14. The system according to claim 9, wherein the adaptive filter is configured to generate the filtered signal from the initial signal according to one or more coefficients, wherein the one or more coefficients are updated based on a difference between the filtered signal and the target signal.

15. The system according to claim 9 wherein the adaptive filter is a Wiener filter.

16. The system according to claim 9 wherein the full duplex radio-transceiver is a full duplex weather radar transceiver.

17. One or more non-transitory storage media comprising computer instructions executable by a processing means of a full-duplex radio transceiver, the computer instructions when executed by the processing means causing the transceiver to:

transmit a transmit signal from a transmit path of the transceiver;

receive a receive signal at a receive path of the transceiver, the receive signal including a self-interference signal component due to self-interference between the transmit path and the receive path, the self-interference to be cancelled;

generate a filtered signal by filtering an initial signal from the transmit path according to one or more coefficients which define a transfer function of an adaptive filter, the adaptive filter being configured based on a target signal derived from the receive signal, the filtered signal being an estimate of the self-interference in the received signal in the receive path, wherein the initial signal is a copy of the transmit signal; and subtract a cancellation signal from the receive signal; the cancellation signal being defined by the filtered signal and the cancellation signal being subtracted from the received signal in the receive path using a combiner in order to remove the self-interference and obtain a signal of interest;

wherein the target signal is derived from the receive signal by estimating the self-interference signal component in the receive signal based on the receive signal and the cancellation signal is the filtered signal, or wherein the target signal is a part of the receive signal and the cancellation signal is derived from the filtered signal by estimating a part of the filtered signal based on the filtered signal, the part of the filtered signal being equal to the self-interference signal component.

* * * * *